US008693072B2

(12) United States Patent
Osakabe et al.

(10) Patent No.: US 8,693,072 B2
(45) Date of Patent: Apr. 8, 2014

(54) IMAGE READING APPARATUS

(75) Inventors: Yoshinori Osakabe, Seto (JP); Katsuro Miura, Toyota (JP); Muneaki Takahata, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 179 days.

(21) Appl. No.: 13/431,793

(22) Filed: Mar. 27, 2012

(65) Prior Publication Data
US 2013/0003136 A1 Jan. 3, 2013

(30) Foreign Application Priority Data

Jun. 30, 2011 (JP) .................... 2011-146447

(51) Int. Cl.
*H04N 1/40* (2006.01)
*H04N 1/04* (2006.01)

(52) U.S. Cl.
USPC ........... 358/498; 358/449; 358/451; 358/474; 358/496; 358/505; 358/1.9

(58) Field of Classification Search
USPC .................... 358/500–540, 400–498
See application file for complete search history.

(56) References Cited

U.S. PATENT DOCUMENTS

| | | | | |
|---|---|---|---|---|
| 5,339,139 A | * | 8/1994 | Fullerton et al. | 399/203 |
| 5,402,252 A | * | 3/1995 | Kojima | 358/486 |
| 5,430,536 A | * | 7/1995 | Fullerton et al. | 399/364 |
| 5,510,909 A | * | 4/1996 | Morikawa et al. | 358/498 |
| 5,596,399 A | * | 1/1997 | Dempsey et al. | 399/45 |
| 5,690,324 A | * | 11/1997 | Otomo et al. | 270/58.02 |
| 5,796,928 A | | 8/1998 | Toyomura et al. | |
| 6,339,483 B1 | | 1/2002 | Hoshino et al. | |
| 7,744,209 B2 | * | 6/2010 | Nakashima | 347/104 |
| 7,995,250 B2 | * | 8/2011 | Kato | 358/474 |
| 8,059,314 B2 | * | 11/2011 | Ishido | 358/474 |
| 8,305,661 B2 | * | 11/2012 | Baba | 358/505 |
| 8,582,991 B2 | * | 11/2013 | Naitoh et al. | 399/45 |
| 2002/0101025 A1 | | 8/2002 | Lee et al. | |

(Continued)

FOREIGN PATENT DOCUMENTS

| | | |
|---|---|---|
| EP | 0428408 A2 | 5/1991 |
| JP | H07-236034 A | 9/1995 |

(Continued)

OTHER PUBLICATIONS

European Patent Office, Extended European Search Report for European Patent Application No. 12161647.8 (counterpart to above-captioned patent application), mailed Aug. 23, 2013.

*Primary Examiner* — Richard Zhu
(74) *Attorney, Agent, or Firm* — Baker Botts L.L.P.

(57) ABSTRACT

An image reading apparatus, including a driving unit, a separator unit, a conveyer unit, a reader unit, a reducer unit, a size detecting unit; and a controller is provided. The separator unit includes a drive shaft, a contact member, and a clutch. The controller manipulates the conveyer unit via the driving unit to convey the sheet at a first conveying speed when the size of the sheet detected by the size detecting unit is greater than a predetermined size. The controller manipulates the conveyer unit via the driving unit to convey the sheet at a second conveying speed, which is lower than the first conveying speed, when the size of the sheet detected by the size detecting unit is one of smaller than and equivalent to the predetermined size.

6 Claims, 9 Drawing Sheets

(56) References Cited

U.S. PATENT DOCUMENTS

| | | |
|---|---|---|
| 2006/0220300 A1 | 10/2006 | Nakakita et al. |
| 2007/0002406 A1* | 1/2007 | Kato .............................. 358/505 |
| 2008/0112021 A1 | 5/2008 | Katsuyama |
| 2009/0309291 A1* | 12/2009 | Yasui et al. ................... 271/9.01 |
| 2010/0277777 A1* | 11/2010 | Baba ............................. 358/505 |
| 2010/0322692 A1* | 12/2010 | Iguchi et al. .................. 399/407 |
| 2011/0205604 A1* | 8/2011 | Imaizumi et al. ............. 358/498 |

FOREIGN PATENT DOCUMENTS

| | | |
|---|---|---|
| JP | H07-254964 A | 10/1995 |
| JP | H11-098314 A | 4/1999 |
| JP | H11-341228 A | 12/1999 |
| JP | 2000-177869 A | 6/2000 |
| JP | 2006-256777 A | 9/2006 |

\* cited by examiner

| SHEET SIZE | SHEET WIDTH (mm) | SHEET LENGTH (mm) | SIZE-ASSOCIATED CONVEYING SPEED(mm/s) |
|---|---|---|---|
| A5 | 148.5 | 210 | FIRST CONVEYING SPEED |
| B5 | 182 | 257 | SECOND CONVEYING SPEED |
| A4 | 210 | 297 | THIRD CONVEYING SPEED |

| RESOLUTION (dpi) | RESOLUTION-ASSOCIATED CONVEYER SPEED (mm/s) |
|---|---|
| 100 | THIRD CONVEYING SPEED |
| 200 | SECOND CONVEYING SPEED |
| 300 | FIRST CONVEYING SPEED |

IMAGE READING APPARATUS

CROSS REFERENCE TO RELATED APPLICATION

This application claims priority from Japanese Patent Application No. 2011-146447, filed on Jun. 30, 2011, the entire subject matter of which is incorporated herein by reference.

BACKGROUND

1. Technical Field

An aspect of the present invention relates to an image reading apparatus having an edge detecting system, which is capable of detecting an edge of a sheet being conveyed in a sheet conveyer path.

2. Related Art

An image reading apparatus, in which a plurality of stacked original sheets are separated one-by-one and conveyed sequentially along a predetermined sheet conveyer path, is known. Whilst the original sheets are conveyed, original images appearing on the original sheets are sequentially read by an image reader.

In such an image reading apparatus, for example, the stacked original sheets may be separated by a feeder member and a separator member to be fed one-by-one along the sheet conveyer path toward a downstream side, in which an edge sensor detects a front edge of the original sheet being conveyed. Upon detection of the front edge of the original sheet, the image reading apparatus may control an image reader to read the original image on the original sheet.

For another example, an image reading apparatus with a roller, which contains a one-round clutch to separate and convey the stacked original sheets one-by-one, is known. The roller may include a cylindrical contact piece, which is to be in contact with the original sheet and is rotatable, and a drive shaft, which is rotated by a drive source. The drive shaft may penetrate the contact piece along an axial direction and allow the contact piece to idle for a predetermined amount with respect to the rotation of the drive shaft. Therefore, depending on a position of the contact piece with respect to the drive shaft, the contact piece may be rotated along with the drive shaft or may be rotated regardless of the rotation of the drive shaft. In particular, the roller may separate and convey the original sheets when the contact piece is rotatable along with the drive shaft.

SUMMARY

Generally, in a sheet conveying system, in which an original sheet is conveyed in a predetermined conveying direction along a sheet conveyer path, a speed to convey the sheet is greater at a downstream side along the conveying direction than a speed at an upstream side in order to prevent or reduce conveyance errors such as sheet jam.

In the above-mentioned latter configuration of the image reading apparatus having the roller with the one-round clutch at a sheet-separating area, gaps are created in between the sequentially-conveyed original sheets. An amount of the gap may vary depending on a difference between a conveying speed at the separating area and a conveying speed at a downstream area with respect to the separating area and a length of a recovery period. The recovery period ranges between a point, in which the contact piece completes idling with respect to the drive shaft, and a point, in which the contact piece recovers to be rotated once again along with the drive shaft.

The length of the recovery period depends on, or corresponds to, a length of a period, in which the sheet being conveyed at the conveying speed of the downstream area is in contact with the roller in the separator section. Therefore, the amount of the gap created in between the sequentially conveyed sheets depends on a length of the sheets along the sheet conveying direction. More specifically, the smaller the size of the sheets is, the smaller the amount of the gap becomes.

Meanwhile, in the above-mentioned former configuration of the image reading apparatus having the edge detector, the edge detector may be configured with a movable member, which is moved by the front edge of the sheet being conveyed, and a sensor to detect the movement of the movable member. Whilst the amount of the gap between the sheets depends on the length of the sheets, when the size of the sheets is small, the amount of the gap may be too small to move the movable member fully to a detective position or too small for the sheet to recover to an initial position. Thus, the front end of the succeeding sheet may not be detected correctly, and the gap may not be recognized correctly. Accordingly, image reading operations based on the edge detection may not be carried out properly, and it may be difficult to maintain quality of reading the images.

In consideration of the difficulty, it may be controlled that the amount of the gap between the sequentially conveyed sheets is maintained constant regardless of the size of the sheet. However, in order to have the sensor to correctly detect the front ends of the sheets regardless of the various sheet sizes, it may be necessary to reduce the entire conveying speed. In other words, the speed to read the original images tends to be undesirably lowered.

In view of the difficulties, the present invention is advantageous in that an image reading apparatus having a detecting system, which is capable of detecting edges of sheets being conveyed regardless of sizes of the sheets, to read the original images correctly, is provided.

According to an aspect of the present invention, an image reading apparatus is provided. The image reading apparatus includes a driving unit, a separator unit configured to separate a plurality of stacked sheets one-by-one and convey the separated sheets along a conveyer path, a conveyer unit configured to be driven by driving force transmitted from the driving unit to convey the sheets separated by the separator unit in a conveying direction further along the conveyer path, a reader unit configured to read images from the sheets being conveyed along the conveyer path, a reducer unit configured to reduce the driving force transmitted to the conveyer unit at a predetermined reduction ratio and transmits the reduced driving force to the separator unit, a size detecting unit configured to detect a size of the sheet being conveyed, and a controller configured to control operations in the image reading apparatus including a conveying speed to convey the sheet. The controller manipulates the conveyer unit via the driving unit to convey the sheet at a first conveying speed when the size of the sheet detected by the size detecting unit is greater than a predetermined size. The controller manipulates the conveyer unit via the driving unit to convey the sheet at a second conveying speed, which is lower than the first conveying speed, when the size of the sheet detected by the size detecting unit is one of smaller than and equivalent to the predetermined size.

BRIEF DESCRIPTION OF THE ACCOMPANYING DRAWINGS

DETAILED DESCRIPTION

Hereinafter, an image reading apparatus 1 representing the image reading apparatus according to an embodiment of the present invention will be described with reference to the accompanying drawings.

In the present embodiment described below, directions concerning the image reading apparatus 1 will be based on a user's position to ordinary use the image reading apparatus 1 and as indicated by arrows shown in FIGS. 1-5. Therefore, according to FIG. 1, for example, a viewer's lower-left side is referred to as the user's front, and a viewer's upper-right side is referred to as the user's rear. A viewer's upper-left side is referred to as the user's left, and a viewer's lower-right side is referred to as the user's right. Further, the user's front-rear direction of the image reading apparatus 1 may also be referred to as a direction of depth, and the user's lateral (right-left) direction of the image reading apparatus 1 may also be referred to as a crosswise direction. The up-down direction appearing in FIG. 1 may also be referred to as a vertical direction.

Figure 1:
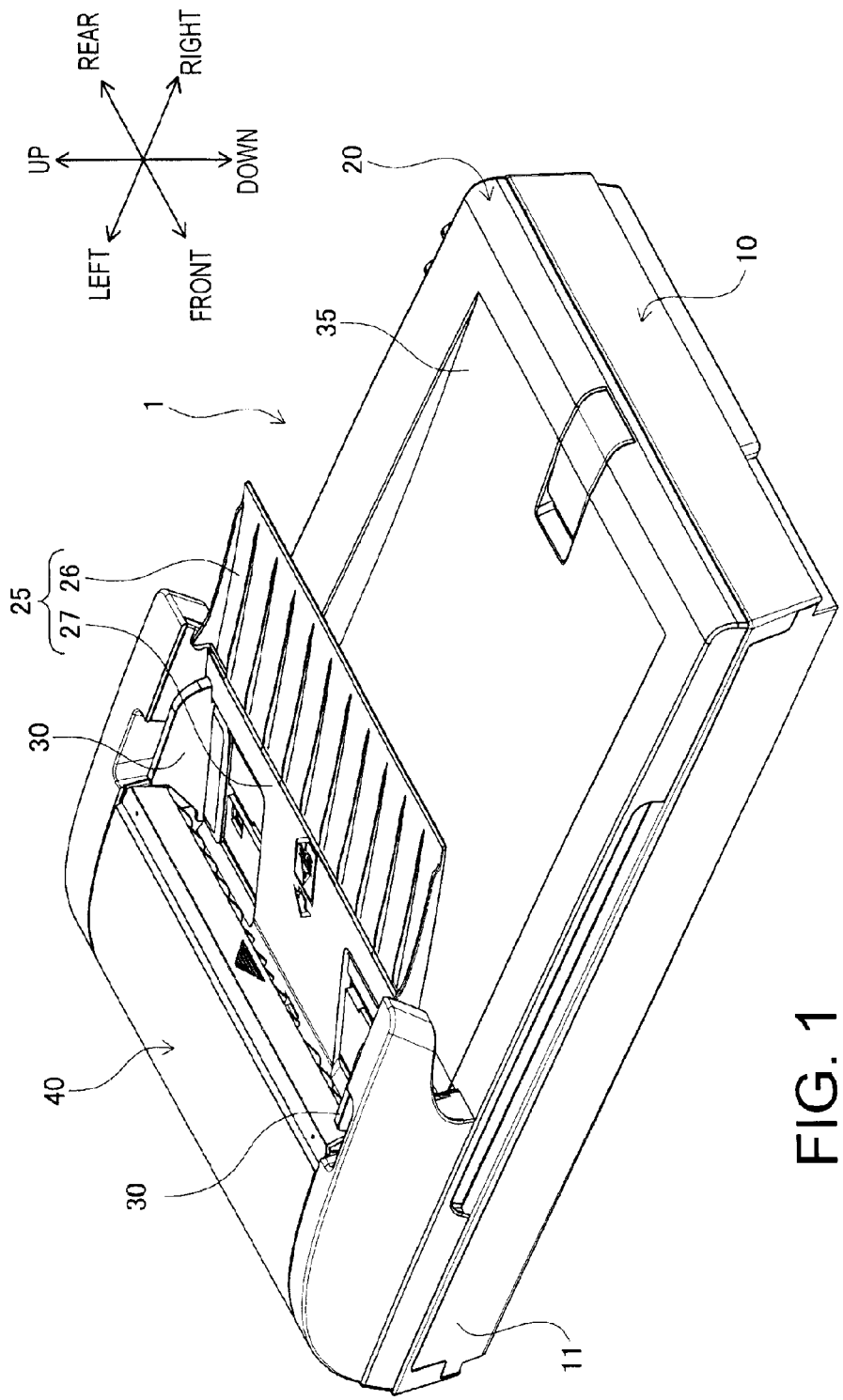
FIG. 1 is a perspective view of an image reading apparatus according to an embodiment of the present invention.
Figure 2:
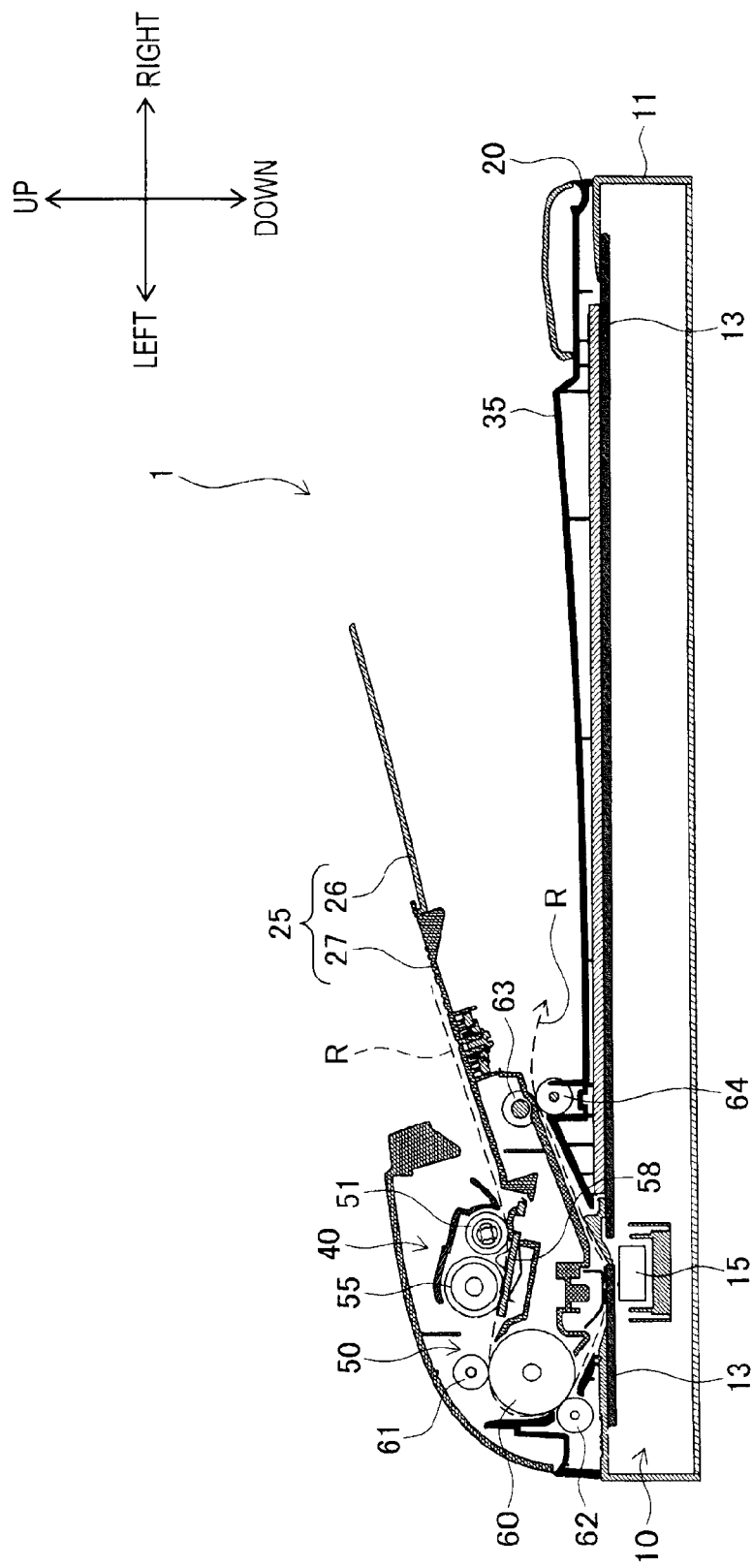
FIG. 2 is a cross-sectional of the image reading apparatus according to the embodiment of the present invention.

As shown in FIG. 1, the image reading apparatus 1 has a scanner unit 10 and an sheet cover 20. The scanner unit 10 includes a scanner housing 11, a contact glass 13, and an image sensor 15 and serves as a flatbed scanner. The scanner housing 11 is formed to have a shape of a horizontally flat box and serves as a shell of the scanner unit 10. The scanner housing 11 accommodates the image sensor 15, a slider shaft (not shown), a driving motor (not shown), and a control unit 80 (see 8).

The contact glass 13 is a piece of transparent plate, which is made of, for example, glass or acrylic resin, and is placed in an upper position in the scanner hosing 11. The contact glass 13 is a so-called platen glass and is formed to have a rectangular shape, of which longer sides are aligned along the crosswise direction. On a top surface of the contact glass 13, original sheets SA, SB, SC (see FIG. 5) with original images to be read by the scanner unit 10 can be placed.

The image sensor 15 is a contact image sensor (CIS), which can read the original image on the original sheet being placed on the contact glass 13. The image sensor 15 arranged underneath the contact glass 13 is formed to have a readable range along a main scanning direction the direction of depth in the image reading apparatus 1). Further, the image sensor 15 is slidably movable along the slider shaft, which extends along an auxiliary scanning direction (e.g., the crosswise direction), within a predetermined crosswise slidable range. Thus, the image sensor 15 is moved in cooperation with a known belt-driving system (not shown) to reciprocate in the auxiliary direction along the contact glass 13 by driving force provided from the driving motor.

Next, the sheet cover 20 will be described hereinbelow. The sheet cover unit 20 is rotatable about a rear edge of a top plane of the scanner housing 11 via hinges 16 (see FIG. 5) to be openable and closable with respect to a top plane (i.e., the contact glass 13) of the scanner unit 10. When the sheet cover 20 is open with respect to the scanner unit 10, the contact glass 13 at the top of the scanner unit 10 is exposed, and when the sheet cover 20 is in a closed position (see FIG. 2), the contact glass 13 on the top plane of the scanner housing 11 is covered. When the sheet cover 20 is in the closed position, the sheet cover 20 can hold the original sheet in place to be in close contact with the contact glass 13. Therefore, the original image appearing on the surface of the original sheet, which is held steadily against the contact glass 13 by the sheet cover 20, can be read in preferable condition by the image sensor 15.

The sheet cover 20 has a sheet placement section 25, a discharge tray 35, and an ADF unit 40. The sheet placement section 25 and the discharge tray 35 are arranged to form vertically overlapping layers (see FIGS. 1 and 2). That is, as shown in FIG. 1, a part of the discharge tray 35 is covered by the sheet placement section 25.

The sheet placement section 25 includes a sheet-feed tray 26 and a sheet-feed guide 27. The original sheets, which are to be conveyed by the ADF unit 40, with the original images to be read by the scanner unit 10, can be placed in the sheet placement section 25. In the present embodiment, the sheet placement section 25 can have, at least, original sheets in three different sizes placed thereon. The sizes of the original sheets which can be placed in the sheet placement section 25 include SA, SB, and SC (see FIG. 5). In the present embodiment, the original sheet SA is in the so-called A5 size, which has a width of 148.5 min and a length of 210 mm. The original sheet SB is in the so-called A4 size, which has a width of 210 mm and a length of 297 mm, and the original sheet SC is in the so-called B5 size, which has a width of 182 mm and a length of 257 mm. In the following description, the "original sheet S" may refer to any of the original sheets SA, SB, SC.

In the present embodiment, the width of the original sheet S refers to a dimension of the shorter sides of the rectangular original sheet S, and the length of the original sheet S refers to a dimension of the longer sides of the rectangular original sheet S. As has been described above, the original sheet SB has a greater width than the width of the original sheet SA. The original sheet SC has a greater width than the width of the original sheet SA and a smaller width than the width of the original sheet SB. In the sheet placement section 25, the original sheets SA, SB, SC are set with the longer sides aligned along the crosswise (right-left) direction of the image reading apparatus 1.

On the sheet-feed guide 27, a pair of sheet guides 30 (see FIG. 1) is arranged. The sheet guides 30 are slidable along the direction of depth of the image reading apparatus 1 to be placed in positions to fit the width of the original sheets S. Thus, the sheet guides 30 restrict widthwise positions of the original sheets S placed in the sheet placement section 25. More specifically, the sheet guides 30 are slidably movable in mutually opposite directions from each other along the direction of depth in cooperation with each other. Therefore, when one of the sheet guides 30 are slidably moved in one direction along the direction of depth, the other of the sheet guides 30 slidably moves in an opposite direction from the initially moved sheet guide 30. Thus, when one of the sheet guides 30 is moved to fit one of the lengthwise edges of the original sheet S being placed in the sheet placement section 25, the other of the sheet guides 30 moves accordingly, and the sheet guides 30 come to fit the both lengthwise edges of the original sheet S. Thus, a widthwise center of the original sheets S is placed in a constant center position within the depth of the sheet placement section 25 regardless of the widthwise dimensions of the original sheets S. Thus, the original sheets S may be prevented from being in a skew orientation with respect to a sheet conveying direction, i.e., along a sheet conveyer path R (see FIG. 2).

The sheet conveyer path R originates from the sheet placement section 25 and ends at the discharge tray 35. The sheet conveyer path R originating from the sheet placement section 25 extends inside the ADF unit 10 and is turned in a shape of a 90-degrees rotated "U" in a cross section. The sheet conveyer path R is defined by parts and members included in the ADF unit 40, such as ribs and guiding plates, and is formed to have a predetermined height for the original sheets S to pass through. The original sheets S are conveyed, along the sheet conveyer path R from the sheet placement section 25, reversed at the U-curved section at the left-hand side in the ADF unit 40, and released in the discharge tray 35 (see FIGS. 2 and 3). In the present embodiment, a direction from the sheet placement section 25 toward the discharge tray 35 via the U-curved section along the sheet conveyer path R is referred to as a sheet conveying direction.

The ADF unit 40 arranged at a left-hand side of the sheet cover 20 separates the original sheets S set in the sheet placement section 25 one-by-one and conveys the separated original sheets sequentially along the sheet conveyer path R. In the image reading apparatus 1, whilst the ADF unit 40 conveys the original sheets S along the sheet conveyer path R, the image sensor 15 reads the images appearing on the original sheets S being conveyed.

The ADF unit 40 according to the present embodiment includes a sheet conveyer 50, a sheet conveyer motor M (see FIG. 8), a reducer system 65 (see FIG. 3), a size detecting sensor 70, and an edge detecting sensor 75. The sheet conveyer 50 includes a draw-in roller 51, a transmission gear 52, a separator roller 55, a main roller 60, a first driven roller 61, a second driven roller 62, a discharge roller 63, a pinch roller 64, and the reducer system 65. Circumferential surfaces of the rollers 51, 52, 55, 60, 61, 62, 63, 64 are exposed to the sheet conveyer path R.

The draw-in roller 51 is rotatably supported at a downstream position with respect to the sheet placement section 25 along the sheet conveying direction and at a position to be in contact with an upper surface of the original sheet S being conveyed in the sheet conveyer path R. The draw-in roller 51 is driven by the sheet conveyer motor M to convey the original sheet S in the sheet conveying direction from the sheet placement section 25 toward the downstream side.

The transmission gear 52 is arranged in a position to be rotatably in contact with the draw-in roller 51 and the separator roller 55. The transmission gear 52 transmits the driving force, which is supplied from the sheet conveyer motor M and transmitted to the separator roller 55, to the draw-in roller 51 (see FIG. 3). Thus, the draw-in roller 51 is rotated by the driving force from the sheet conveyer motor M via the transmission gear 52.

The separator roller 55 is rotatably supported at a downstream position with respect to the draw-in roller 51 along the sheet conveying direction and at a position to be in contact with the upper surface of the original sheet S being conveyed in the sheet conveyer path R. The separator roller 55 includes a contact rotor 56 and a drive shaft 57 (see FIG. 3). The separator roller 55 will be described later in detail. The separator roller 55 is rotated by the sheet conveyer motor M, separates one of the original sheets S from the other original sheets S stacked in the sheet placement section 25 in cooperation with a separator pad 58, and conveys the separated original sheet S toward the downstream along the sheet conveyer path R.

The separator pad 58 is a thin pad member which is made of a material with predetermined degree of flexibility and friction coefficient. The separator pad 58 is arranged at a downstream position with respect to the draw-in roller 51 and in a position to face the separator roller 55 across the sheet conveyer path R. In particular, the separator pad 58 is arranged in a position to be in contact with a lower surface of the original sheet facing the separator roller 55. The separator pad 58 applies friction force to the original sheet S to be conveyed and separates the original sheet S from the other original sheets S set in the sheet placement section 25 in cooperation with the separator roller 55.

The main roller 60 is rotatably supported at a downstream side with respect to the separator roller 55 along the sheet conveyer path R (e.g., at a left-side end of the sheet conveyer path R). The main roller 60 is rotated by the driving force from the sheet conveyer motor M. A circumferential surface of the main roller 60 defines the U-curved section in the sheet conveyer path R.

The first driven roller 61 is arranged in an upper position with respect to the main roller 60 and a position to face the main roller 60 across the sheet conveyer path R. The first driven roller 61 is rotatably supported and is driven to rotate along with the rotation of the main roller 60. The second driven roller 62 is arranged in a lower position with respect to the main roller 60 and a position to face the main roller 60 across the sheet conveyer path R. The second driven roller 62 is rotatably supported and is driven to rotate along with the rotation of the main roller 60.

The discharge roller 63 is arranged at a most downstream position in the sheet conveyer path R. The discharge roller 63 is rotated by the driving force from the sheet conveyer motor M, similarly to the draw-in roller 51, the separator roller 55, and the main roller 60. The pinch roller 64 is arranged at a lower position with respect to the discharge roller 63 and in a position to face the discharge roller 63. The pinch roller 64 is driven to rotate along with the rotation of the discharge roller 63.

Figure 3:
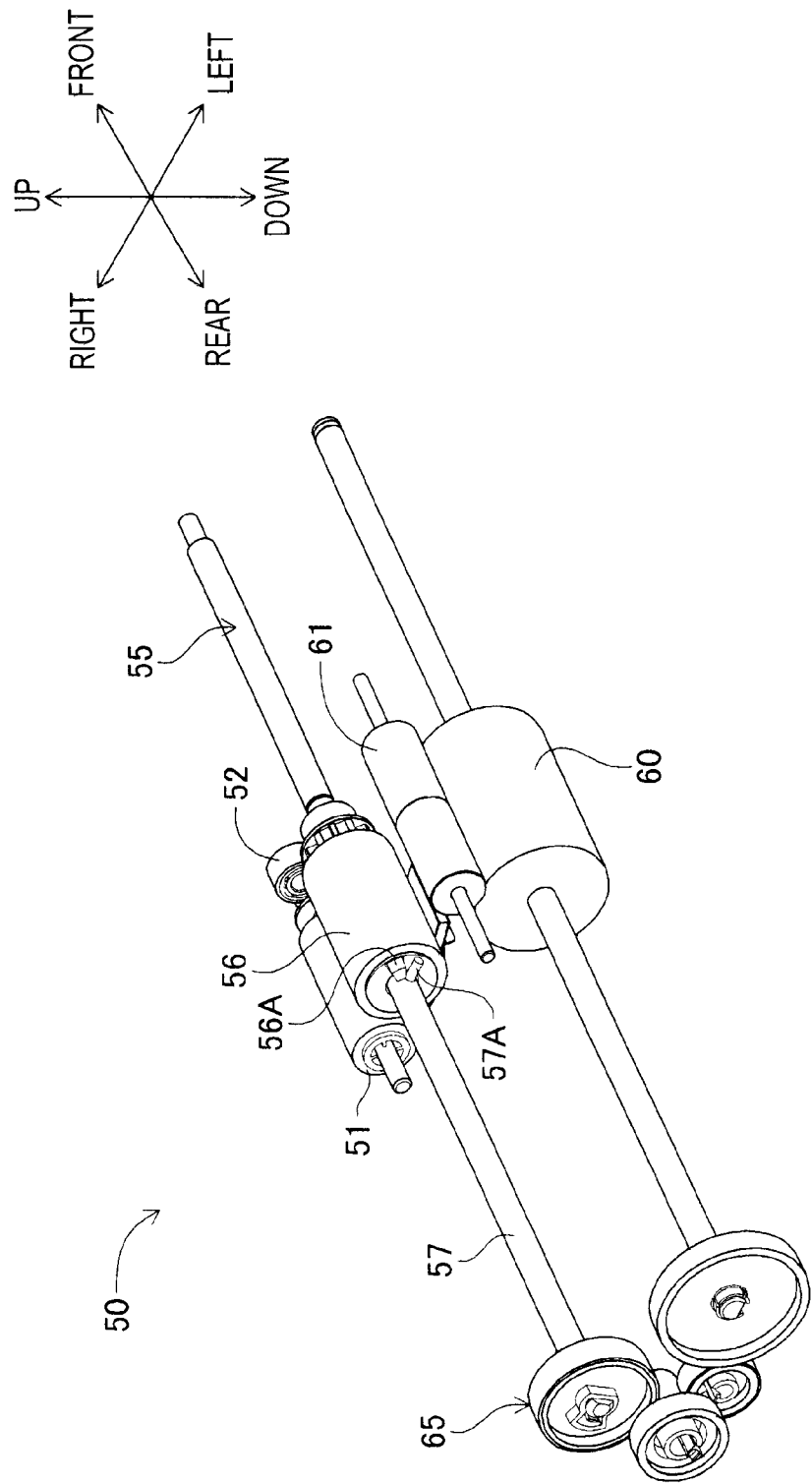
FIG. 3 is a perspective view of a sheet conveyer in an ADF (auto document feeder) unit of the image reading apparatus according to the embodiment of the present invention.

As shown in FIG. 3, the reducer system 65 has a plurality of gears, which include a gear arranged on one end of a rotation shaft of the main roller 60 and a gear arranged on one end of the drive shaft 57 of the separator roller 55. These gears transmit the driving force from the sheet conveyer motor M to the main roller 60 and the separator roller 55. The reducer system 65 reduces the driving force transmitted to the main roller 60 via the gear train at a predetermined reduction rate by use of a predetermined gear ratio and transmits the reduced driving force to the drive shaft 57 of the separator roller 55.

Next, the configuration of the separator roller 55 will be described with reference to FIG. 3. As mentioned above, the separator roller 55 includes the contact rotor 56 and the drive shaft 57. The contact rotor 56 is a cylindrical piece having: circumferential surface, which is to be in contact with the surface of the original sheet S being conveyed in the sheet conveyer path R. The contact rotor 56 is rotatable with respect to the drive shaft 57, which penetrates the contact rotor 56. The contact rotor 56 has a projection 56A in a predetermined position on one of planar surfaces (e.g., a rear surface). The projection 56A projects along an axial direction of the separator roller 55.

The drive shaft 57 has a gear being a part of the reducer system 65 at one axial end thereof and is rotated by the driving force from the sheet conveyer motor M in a lower velocity than a rotation velocity of the main roller 60. Further, the drive shaft 57 has a drive force transmitter 57, which is formed to intersect the axis of the drive shaft 57 orthogonally. The drive force transmitter 57A transmits the driving force in the drive shall 57 to the contact rotor 56 when the drive force transmitter 57A is in contact with the projection 56A of the contact rotor 56. When the drive force transmitter 57A is in contact with the projection 56A of the contact rotor 56, therefore, the contact rotor 56 is rotated along with the drive shaft 57 via the drive force transmitter 57A. Thus, the projection 56A in the contact rotor 56, which is rotatable about the drive shaft 57, and the drive force transmitter 57A in the drive shall 57 serve as a clutch to establish a transmission path between the contact rotor 56 and the drive shaft 57.

Figure 4:
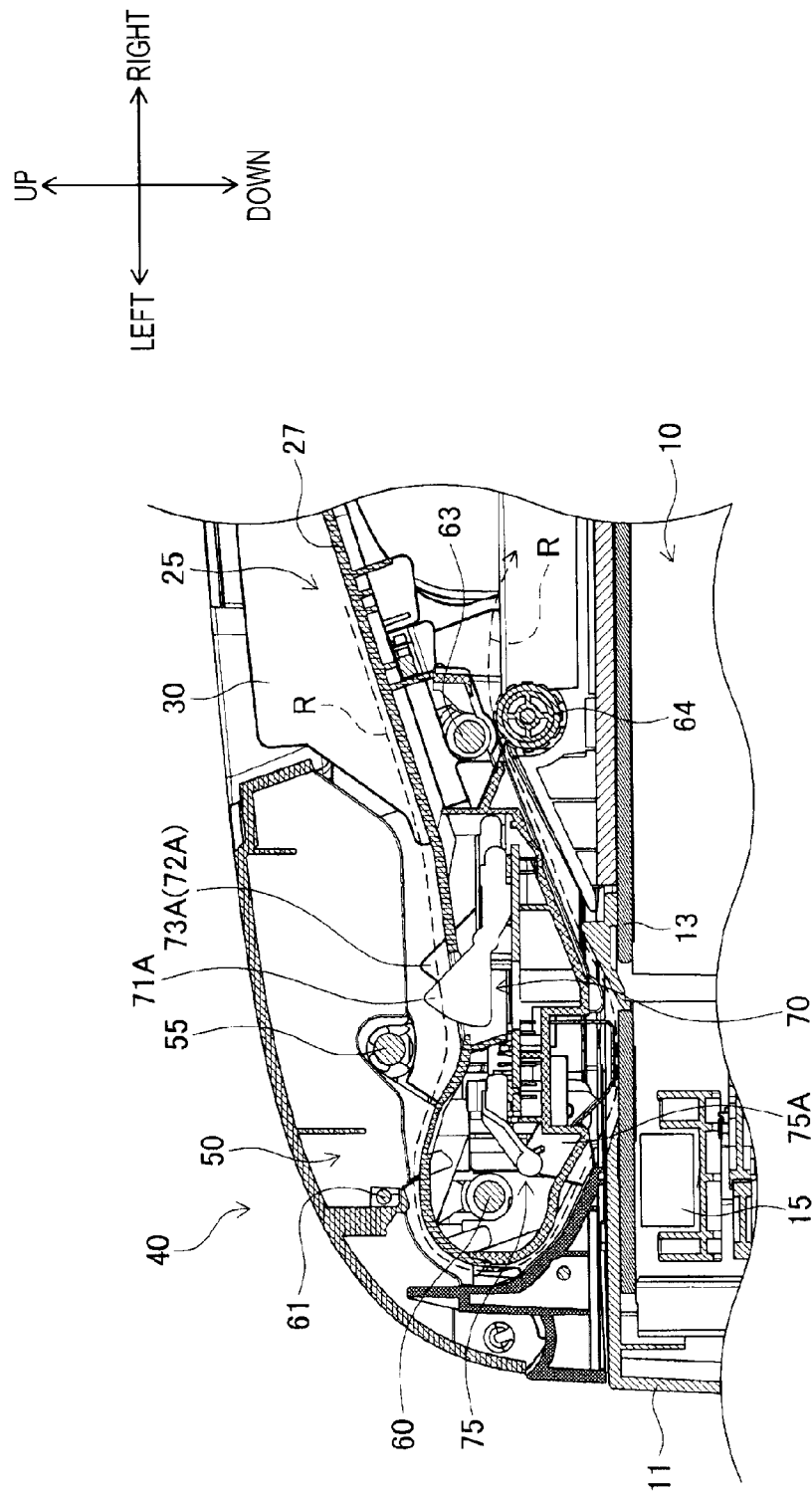
FIG. 4 is a cross-sectional partial view of the ADF unit to illustrate positions of a size detecting sensor and an edge detecting sensor in the image reading apparatus according to the embodiment of the present invention.
Figure 5:
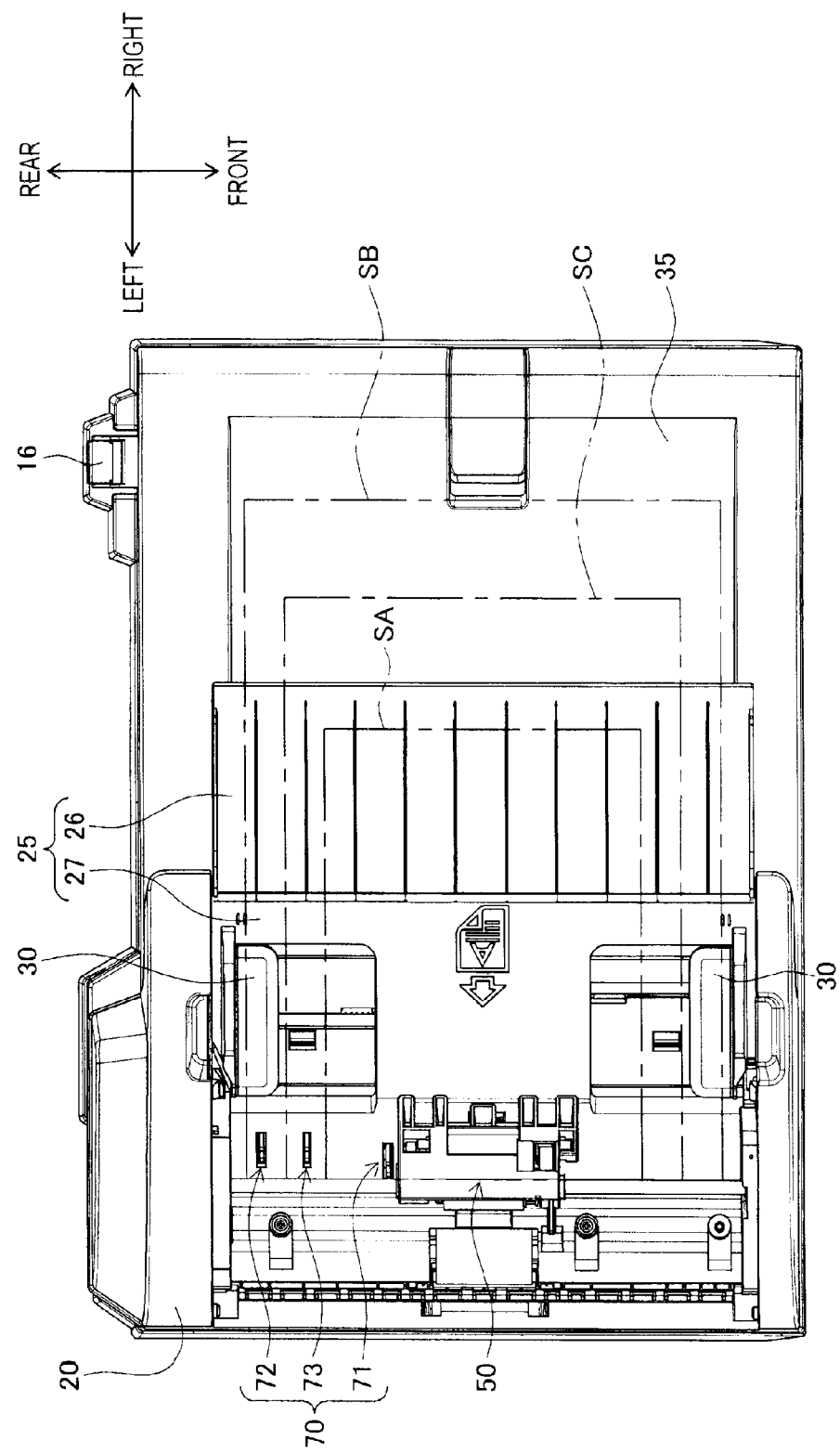
FIG. 5 is a top plane view of the ADF unit to illustrate the position of the size detecting sensor in the image reading unit according to the embodiment of the present invention.
Figure 6A:
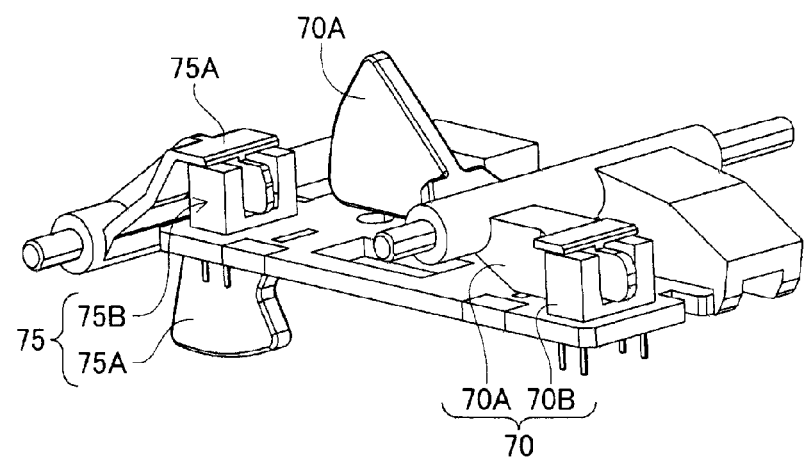
FIGS. 6A and 6B are perspective views of the size detecting sensor and the edge detecting sensor in the image reading apparatus according to the embodiment of the present invention.
Figure 6B:
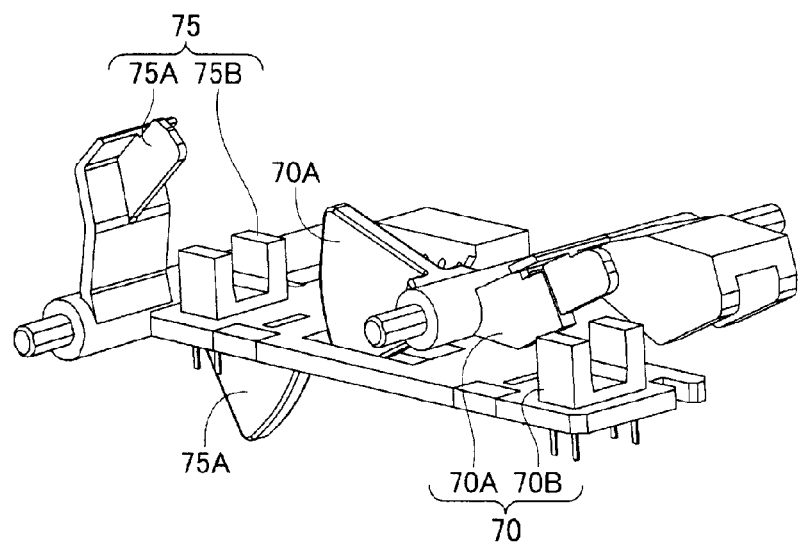

Next, the size detecting sensor 70 and the edge detecting sensor 75 in the ADF unit 40 will be described with reference to FIGS. 4-6. In the following description, a blocker 70A represents a first blocker 71A, a second blocker 72A, and a third blocker 73A (see FIGS. 6A-6C). Further, a detector 70B represents a first detector 71B, a second detector 72B, and a third detector 73B (see FIGS. 6A-6C).

The size detecting sensor 70 is a sensor to detect presence of the original sheet S set in the sheet placement section 25 and to detect a size of the original sheet S when present. The size detecting sensor 70 includes a first sensor 71, a second sensor 72, and a third sensor 73.

The first sensor 71 is arranged in an inner position within the width of the original sheet SA (see FIG. 5) and in the sheet-feed guide 27 at a downstream position with respect to the draw-in roller 51 along the sheet conveying direction. The first sensor 71 includes the first blocker 71A and the first detector 713. The first blocker 714 is rotatably supported to rotate along an orthogonally intersecting direction with respect to the sheet-feed guide 27, and apart of one end of the first blocker 71A is exposed to the sheet conveyer path R through an opening (unsigned) formed in the sheet-feed guide 27. The remaining unexposed part of the first blocker 71A is arranged underneath the sheet-feed guide 27. Within the unexposed part of the first blocker 71A, the other end opposite from the exposed end of the first blocker 71A can be inserted in and retracted from the first detector 71B.

The first detector 71B serves as a photo-interrupter and is arranged in a vicinity of the unexposed end of the first blocker 71A and in a lower position with respect to the unexposed end of the first blocker 71A. The first detector 71B includes a light emitter (not shown) to emit light and a light receiver (not shown) to receive the light emitted from the light emitter. The light emitter and the light receiver are arranged to face each other with a predetermined amount of clearance maintained in between them to reserve a light path for the emitted light.

When no specific external force is applied to the exposed end of the first blocker 71A (see FIG. 6A), the unexposed end of the first blocker 71A interrupts the light path; therefore, the light emitted from the light emitter does not reach the light receiver. Accordingly, the first sensor 71 outputs an "OFF" signal. When the original sheet S being conveyed comes in contact with the exposed end of the first blocker 71A to depress the exposed end of the first blocker 71A, the first blocker 71A is rotated downwardly by the pressure of the original sheet S. In this regard, the unexposed end of the first blocker 71A is uplifted (see FIG. 6B) to move out of the light path. Therefore, the light path is ensured, and the light emitted from the light emitter is received by the light receiver. In this regard, the first sensor 71 outputs an "ON" signal.

The second sensor 72 (see FIG. 5) is arranged in a position outside the width of the original sheet SC and an inner position within the width of the original sheet SB. Further, the second sensor 72 is arranged at an upstream position with respect to the first sensor 71. The second sensor 72 includes the second blocker 72A and the second detector 72B. The second sensor 72 is configured similarly to the first sensor 71 except for the position thereof, which is as described above and shown in FIG. 5. The second sensor 72 outputs the ON signal and the OFF signal based on the rotation of the second blocker 72A, which can be rotated by the original sheet S conveyed from the sheet placement section 25.

The third sensor 73 (see FIG. 5) is arranged in a position outside the width of the original sheet SA and an inner position within the width of the original sheet SC. Further, the third sensor 73 is arranged at the upstream position with respect to the first sensor 71 similarly to the second sensor 72. The third sensor 73 includes the third blocker 73A and the third detector 73B. The third sensor 73 is configured similarly to the first sensor 71 except for the position thereof, which is as described above and shown in FIG. 5. The third sensor 73 outputs the ON signal and the OFF signal based on the rotation of the third blocker 73A, which can be rotated by the original sheet conveyed from the sheet placement section 25.

Thus, the image reading apparatus 1 recognizes the sizes of the original sheets SA, SB, SC set on the sheet-feed guide 27 based on patterns of the ON and OFF signals output from the first, second, third sensors 71, 72, 73.

The edge detecting sensor 75 serves to detect front ends of the original sheets S being conveyed in the sheet conveyer path R at a lower position with respect to the main roller 60. In the present embodiment, in terms of the edges of the original sheet 5, the front end refers to an edge, which is closer to the discharge tray 35 whilst the original sheet S is conveyed in the sheet conveyer path R. The edge detecting sensor 75 includes an edge-contact piece 75A and an edge detector 75B (see FIGS. 6A, 6B). The edge-contact piece 75A is rotatably supported to rotate along an orthogonally intersecting direction with respect to the sheet conveyer path R at the lower section with respect to the main roller 60, and a part of one end thereof protrudes downward to be placed in the sheet conveyer path R. The other upper end of the edge-contact piece 75A opposite from the protruding end can be inserted in and retracted from the edge detector 75B.

The edge detector 75B serves as a photo-interrupter, similarly to the first, second, third detectors 71B, 72B, 73B, and is arranged in a lower position with respect to the upper end of the edge-contact piece 75A. The edge detector 75B includes a light emitter (not shown) to emit light and a light receiver (not shown) to receive the light emitted from the light emitter. The light emitter and the light receiver are arranged to face each other with a predetermined amount of clearance maintained in between them to reserve a light path for the emitted light. When the downward end of the edge-contact piece 75A is released from external force (see FIG. 6A), the upper end of the edge-contact piece 75A interrupts the light path; therefore, the light emitted from the light emitter does not reach the light receiver. In this regard, the edge detecting sensor 75 outputs an "OFF" signal. When the original sheet S being conveyed comes in contact with the downward end of the edge-contact piece 75A, the edge-contact piece 75A is rotated upwardly by the pressure of the original sheet. Accordingly, the upper end of the edge-contact piece 75A is uplifted (see FIG. 6B) to move out of the light path. Therefore, the light path is ensured, and the light emitted from the light emitter is received by the light receiver. In this regard, the edge detecting sensor 75 outputs an "ON" signal.

Next, behaviors of the separator roller 55 and the main roller 60 when the original sheets S are separated and conveyed will be described hereinbelow with reference to FIGS. 7A-7D. As has been described above, in the image reading apparatus 1, the driving force from the sheet conveyer motor M is transmitted to the drive shaft (not shown) of the main roller 60 and to the drive shaft 57 of the separator roller 55 via the reducer system 65. Accordingly, a rotation velocity Vs of the drive shaft 57 is reduced to be smaller than a rotation velocity Vf of the main roller 60.

Figure 7A:
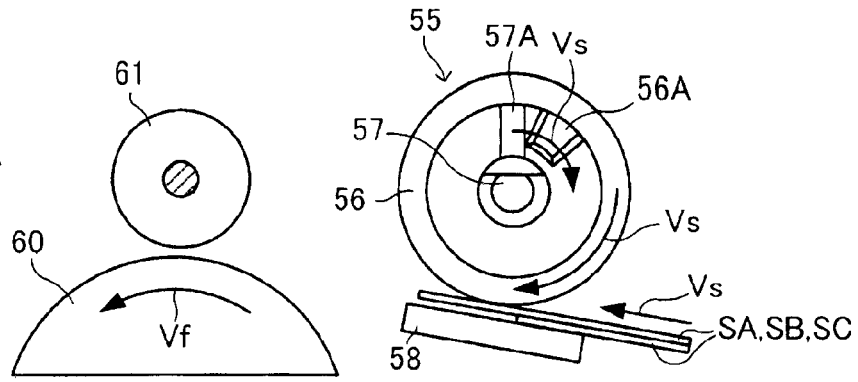
FIGS. 7A-7D are illustrative views to explain behaviors of a separator roller and a main roller during sheet separation and conveyance in the image reading apparatus according to the embodiment of the present invention.

Behaviors of the separator roller 55 and the main roller 60 when the original sheets S set in the sheet placement section 25 are separated one-by-one will be described with reference to FIG. 7A. When the sheet conveyer motor M is activated, the main roller 60 rotates at the rotation velocity Vf, and the separator roller 55 rotates at the rotation velocity Vs. As has been mentioned above, the contact rotor 56 of the separator roller 55 is rotatable with respect to the drive shaft 57 penetrating the contact rotor 56. However, when the projection 56A is in contact with the drive force transmitter 57A, the contact rotor 56 rotates along with the drive shaft 57 at the rotation velocity Vs, in this regard, the original sheets S in the sheet placement section 25 are separated one-by-one by the contact rotor 56 being in cooperation with the separator pad 58 and are conveyed at a conveying speed, which is created based on the rotation velocity Vs.

Figure 7B:
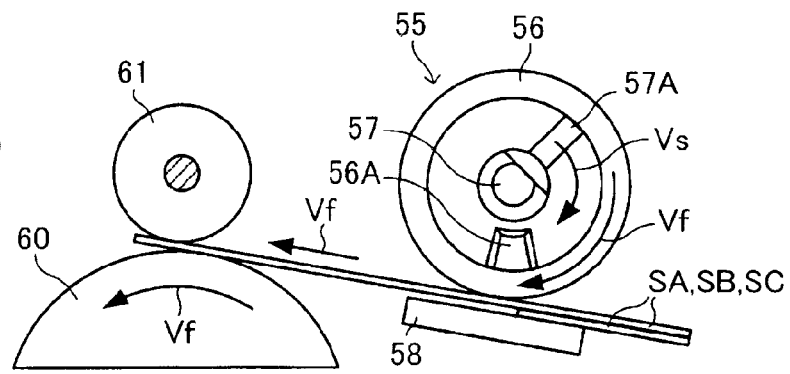

The separated original sheet S is conveyed along the sheet conveyer path R and reaches an intermediate position between the main roller 60 and the first driven roller 61 (see FIG. 7B). In this regard, the original sheet S is in contact with the main roller 60 at the downstream portion and with the separator roller 55 at the upstream portion. Therefore, whilst the rotation velocity Vf of the main roller 60 is greater than the rotation velocity Vs of the separator roller 55, the original sheet S is conveyed by a conveying speed, which is created based on the rotation velocity Vf along the sheet conveyer path R.

In the separator roller 55, the contact rotor 56 is rotatable with respect to the drive shaft 57. Therefore, whilst the contact rotor 56 is in contact with the original sheet S being conveyed at the rotation velocity Vf of the main roller 60, the contact rotor 56 is rotated at the rotation velocity Vf but idles with respect to the drive shaft 57. Meanwhile, the drive shaft 57 rotates at the rotation velocity Vs; therefore, the projection 56A is separated apart from the drive force transmitter 57A of the drive shaft 57 due to the velocity difference between the rotation velocities Vf and Vs. In this regard, a circumferential distance between the projection 56A and the drive force transmitter 57A corresponds to a length of a period, in which the original sheet S is in contact with the main roller 60 at the downstream portion and in contact with the separator roller 55 at the upstream portion simultaneously, within a predetermined idling range. When the period, in which the original sheet S is in contact with the main roller 60 and the separator roller 55 simultaneously, is longer, therefore, the circumferential distance between the projection 56A and the drive force transmitter 57A increases within the idling range.

Figure 7C:
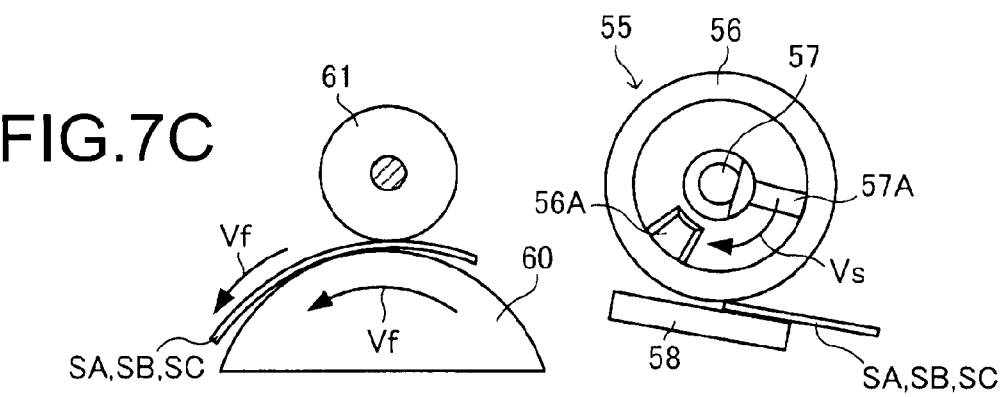

As the original sheet S is conveyed further along the sheet conveyer path R, the original sheet S exits the intermediate position between the separator roller 55 and the separator pad 58 at the upstream area (see FIG. 7C). In this regard, the projection 56 and the drive force transmitter 57A is separated from each other, and the transmission path between the contact rotor 56 and the drive shaft 57 is disconnected. Therefore, when the contact rotor 56 is released from the rotating force of the original sheet S being conveyed, the contact rotor 56 stops rotating, but the drive shaft 57 keeps on rotating at the rotation velocity Vs. In order for the original sheets S set in the sheet placement section 25 to be separated, rotation of the contact rotor 56 is necessary. Therefore, when the contact rotor 56 stops rotating, even though the drive shaft 57 keeps on rotating, the original sheets S are not newly separated or conveyed. On the other hand, the original sheet S released from the separator roller 55 is conveyed by the main roller 60 at the conveying speed created based on the rotation velocity Vf along the sheet conveyer path R.

Figure 7D:
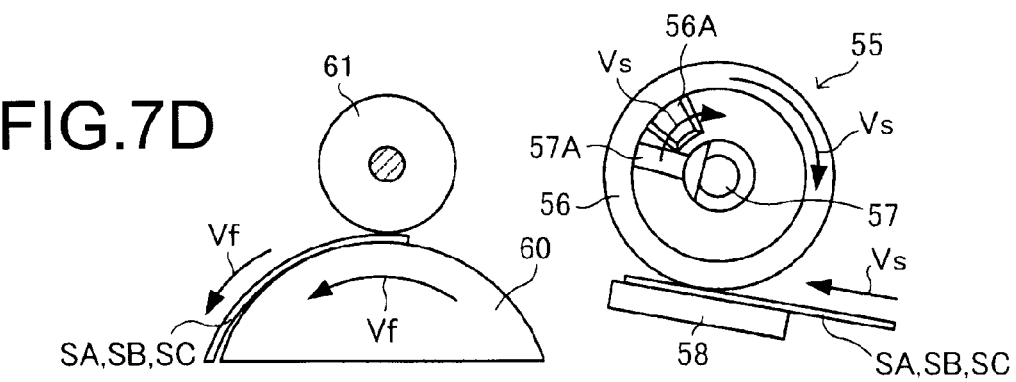

As the drive shaft 57 keeps on rotating at the rotation velocity Vs, the drive force transmitter 57A of the drive shaft 57 rotates to reach the projection 56A once again (see FIG. 7D). When the drive force transmitter 57A comes in contact with the projection 56A, the contact rotor 56 recovers to be rotated along with the drive shaft 57 rotating in the rotation velocity Vs. Accordingly, the contact rotor 56 can separate the original sheets S in the sheet placement section 25 and conveys the separated sheet S at the conveying speed created based on the rotation velocity Vs. Meanwhile, the preceding original sheet S is conveyed by the main roller 60 at the conveying speed created based on the rotation velocity Vf. Thus, in the period between the point, at which the projection 56A is separated from the drive force transmitter 57A, and the point, at which the drive force transmitter 57A comes into contact with the projection 56A once again, the gap is created in between the preceding original sheet S and the succeeding original sheet S.

Within the gap created in between the preceding original sheet S and the succeeding original sheet S, therefore, the edge-contact piece 75A rotated by the preceding original sheet S can recover to the initial downward position. Accordingly, the light path in the edge detector 75B can be stably blocked and opened, in other words, with the gap created in between original sheets S, the edge detecting sensor 75 can steadily detect the front edges of the continuously conveyed original sheets S.

Figures 8, 9, 10:
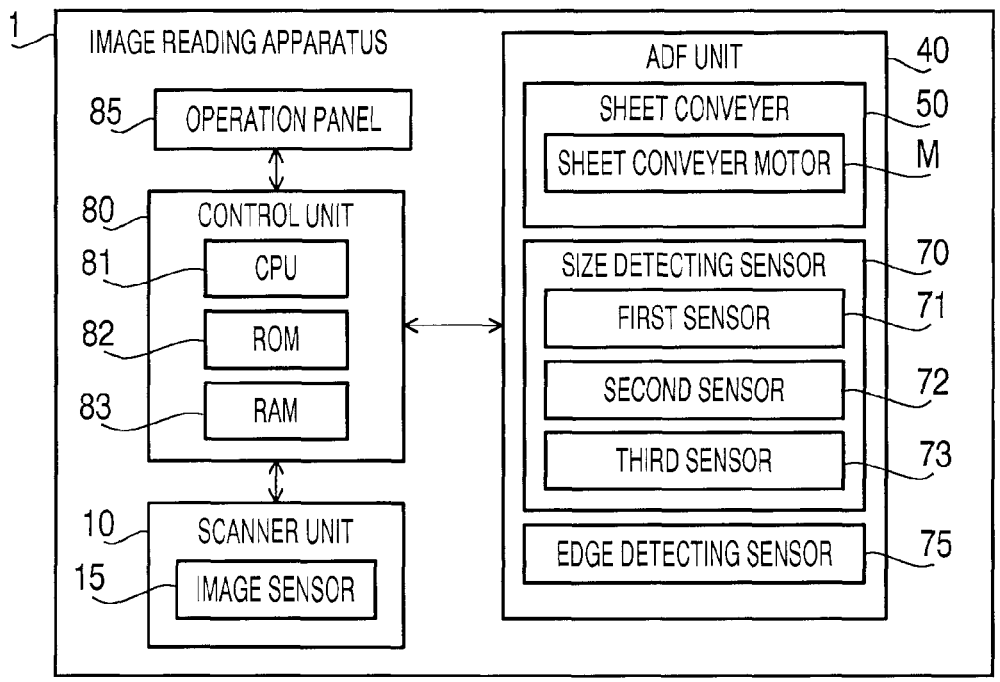
FIG. 8 is a block diagram to illustrate a controlling system in the image reading apparatus according to the embodiment of the present invention.
FIG. 9 is an example of a sheet size/conveying speed correspondence table to be used in the image reading apparatus according to the embodiment of the present invention.
FIG. 10 is an example of a resolution/conveying speed correspondence table to be used in the image reading apparatus according to the embodiment of the present invention.

Next, a controlling system in the image reading apparatus 1 will be described with reference to FIG. 8. As has been mentioned earlier, the image reading apparatus 1 has the control unit 80, which includes a CPU 81, a ROM 82, and a RAM 83. The CPU 81 is a central processing unit to control the behaviors of the image reading apparatus 1 and executes various controlling programs including a read-controlling program (see FIG. 11), which is stored in the ROM 82.

The control unit 80 is connected with the scanner unit 10 and the ADF unit 40. Based on the connection, the control unit 80 manipulates the image sensor 15 and the ADF unit 40 in order to control the image reading operation and the sheet conveying behaviors.

Further, the control unit 80 is connected with the size detecting sensor 70, which includes the first sensor 71, the second sensor 72, the third sensor 73, and with the edge detecting sensor 75. Therefore, the control unit 80 can detect presence and sizes of the original sheets S set in the sheet placement section 25 based on the signals provided by the size detecting sensor 70. Further, the control unit 80 can detect the front edges of the original sheets S passing by the predetermined position along the sheet conveyer path R based on the signals provided by the edge detecting sensor 75. Moreover, the control unit 80 is connected with an operation panel 85 having input keys (not shown), through which the user's instructions are entered. The entered instructions are transmitted to the control unit 80 via the connection between the control unit 80 and the operation panel 85.

Figure 11:
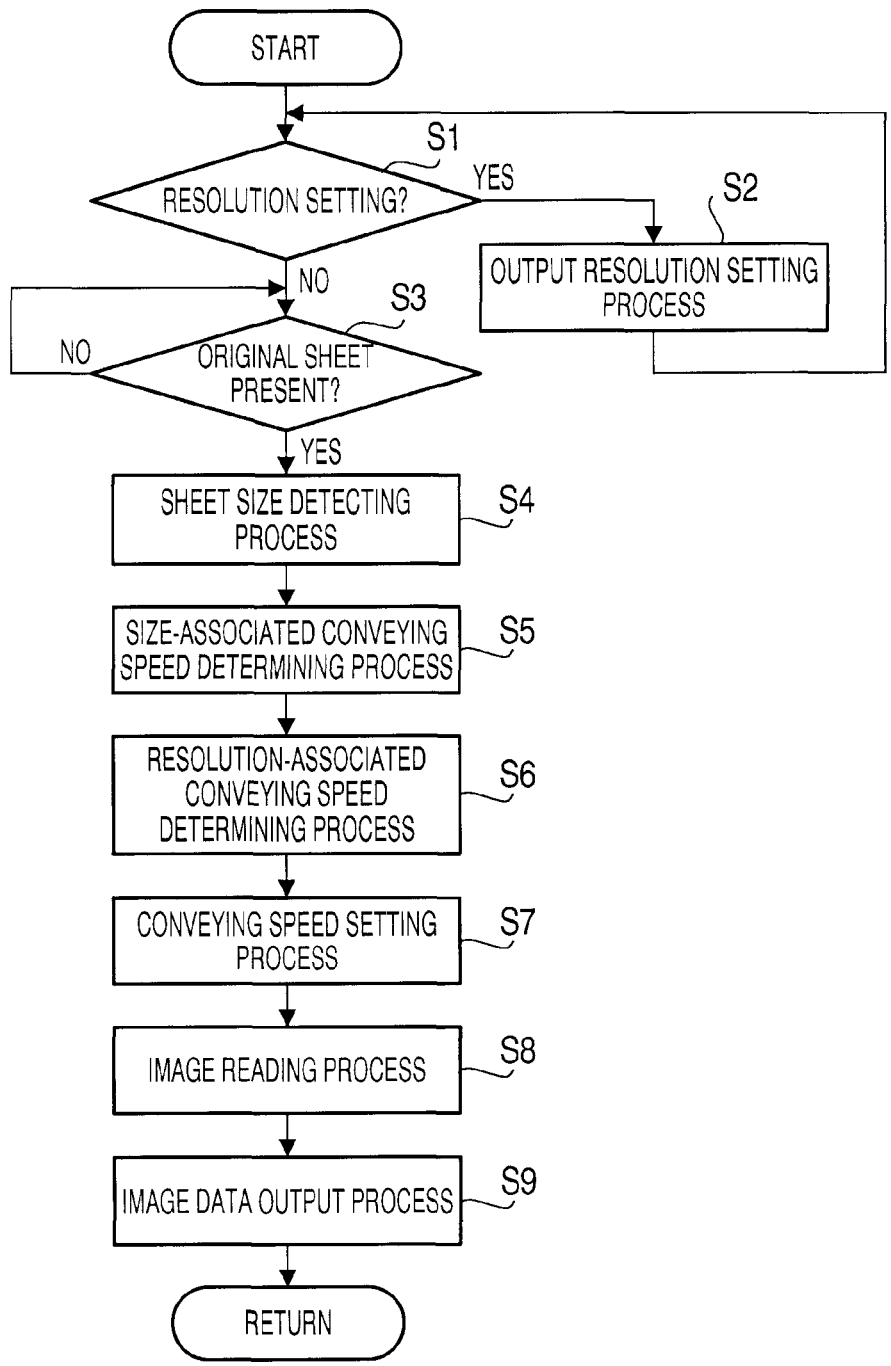
FIG. 11 is a flowchart of a read-controlling operation to be executed in the image reading apparatus according to the embodiment of the present invention.

Next, a flow of the read-controlling program to be executed by the CPU 81 in the image reading apparatus 1 will be described, with reference to FIG. 11. When the flow starts, in S1, the CPU 81 determines if resolution setting is required. The resolution setting refers to preparation of a resolution to output the image, which is to be read by the scanner unit 10. When the resolution setting is required (S1: YES), the flow proceeds to S2. When no new resolution setting is required (S1: NO), the flow proceeds to S3. The resolution setting may be required, for example, when no output resolution has been specified by the user yet. Once the output resolution is specified by the user after S2, the CPU 81 may judge that no new resolution setting is required.

In 92, the CPU 81 executes an output resolution setting process. In particular, the CPU 81 sets the output resolution for the image to be read according to the user's input through the input keys in the operation panel 85. In the present embodiment, the image reading apparatus 1 provides options for the output resolution, which include 100 dpi, 200 dpi, and 400 dpi. The user is required to select one of the three options for the output resolution and, enters the preference through the input keys in the operation panel 85. Based on the user's input, the CPU 81 sets the output resolution. The flow returns to S1.

In S3, the CPU 81 judges whether an original sheet S is set in the sheet placement section 25 based on the signals provided by the size detecting sensor 70. More specifically, the CPU 81 examines whether the ON signal is output from at least the first sensor 71. When presence of an original sheet S is detected (S3: YES), the flow proceeds to S4. When no original sheet is detected in the sheet placement section 25 (S3: NO), the CPU 81 waits until presence of an original sheet S is detected.

In S4, the CPU 81 executes a sheet-size detecting process based on the signals provided by the size detecting sensor 70 including the first sensor 71, the second sensor 72, and the third sensor 73. More specifically, the CPU 81 determines that the original sheet S detected in S3 is an original sheet SA in size A5 when the ON signal is provided solely by the first sensor 71. When the ON signals are provided by the first sensor 71 and the third sensor 73, the CPU 81 determines that the original sheet S detected in S3 is an original sheet SB in size B5. When the ON signals are provided by the first sensor 71, the second sensor 72, and the third sensor 73, the CPU 81 determines that the original sheet S detected in S3 is an original sheet SC in size A4. Thus, the size of the original sheet S is detected. The flow proceeds to S5.

In S5, the CPU 81 executes a size-associated conveying speed determining process. More specifically, the CPU 81 determines a conveying speed (e.g., a value for the rotation velocity Vf of the main roller 60) to convey the original sheet S detected in S3 based on the size of the original sheet S detected in the sheet-size detecting process in S4 and a sheet size/conveying speed correspondence table (see FIG. 9). The conveying speed determined in the size-associated conveying speed in S5 will be referred to as a "size-associated conveying speed" hereinbelow. The size-associated conveying speed determined in S5 is stored in the RAM 83. The flow proceeds to S6.

The sheet size/conveying speed correspondence table defines correspondence between the available sizes (e.g., A5, B5, A4) of the original sheets SA, SB, SC and applicable conveying speeds to convey the original sheets SA, SB, SC respectively. More specifically, in the sheet size/conveying speed correspondence table, the original sheet SA in size A5 is associated with a first conveying speed, and the original sheet SB in size B5 is associated with a second conveying speed, which is higher than the first conveying speed. Further, the original sheet SC in size A4 is associated with a third conveying speed, which is higher than the first conveying speed and the second conveying speed.

Therefore, according to the sheet size/conveying speed correspondence table, the smaller the size of the original sheet to be conveyed is, the lower the conveying speed to convey the original sheet S is set to be. Thus, when the original sheet S in the smaller size (e.g., the original sheet SA) is conveyed, the lower conveying speed (e.g., the first conveying speed) is set. Accordingly, the conveying speed for the gap between two original sheets S to pass by the edge detecting sensor 75 is lowered. Therefore, even if the amount of the gap is small, a substantial period required by the edge detecting sensor 75 to distinctly detect the front edge of the succeeding original sheet S can be reserved. Therefore, the accuracy of the edge detecting sensor 75 can be secured. The size-associated conveying speed determined in S5 is stored in the RAM 83. The flow proceeds to S6.

In the read-controlling program, in S6, the CPU 81 executes a resolution-associated conveying speed determining process. More specifically, the CPU 81 determines a conveying speed (e.g., a value for the rotation velocity Vf of the main roller 60) to convey the original sheet S detected in S3 based on the output resolution set in the output resolution setting process in S2 and a resolution/conveying speed correspondence table (see FIG. 10). The conveying speed determined in the resolution-associated conveying speed determining process in S6 will be referred to as a "resolution-associated conveying speed" hereinbelow. The resolution-associated conveying speed determined in S6 is stored in the RAM 83. The flow proceeds to S7.

The resolution/conveying speed correspondence table defines correspondence between the available output resolutions 100 dpi, 200 dpi, 400 dpi) and the applicable conveying speeds to convey the original sheets respectively. More specifically, in the resolution/conveying speed correspondence table, the output resolution 100 dpi is associated with the third conveying speed, which is the highest amongst the three optional conveying speeds. The output resolution 200 dpi is associated with the second conveying speed, which is lower than the third conveying speed. Further, the output resolution 400 dpi is associated with the first conveying speed, which is lower than the third conveying speed and the second conveying speed. The resolution-associated conveying speed determined in S6 is stored in the RAM 83. The flow proceeds to S7.

In S7, the CPU 81 executes a conveying speed setting process. More specifically, the CPU 81 compares the size-associated conveying speed determined in the size-associated conveying speed determining process in S5 with the resolution-associated conveying speed determined in the resolution-associated conveying speed determining process in S6 and sets a lower one of the conveying speeds to be the conveying speed to convey the original sheet S. The flow proceeds to S8.

In S8, the CPU 81 executes an image reading process. More specifically, the CPU 81 conveys the original sheet S at the conveying speed set in the conveying speed setting process in S7 and reads the original image on appearing on the original sheet S at the resolution, which is associated in the resolution/conveying speed correspondence table (see FIG. 10) with the conveying speed set in the conveying speed setting process in S7, by manipulating the image sensor 15. The image read by the image sensor 15 is stored in the RAM 83. The flow proceeds to S9.

In S9, the CPU 81 executes an image data output process. More specifically, the CPU 81 converts the resolution of the image read in the image reading process in S8 into the output resolution set in the output resolution setting process in S2 based on a resolution converting program, which is stored in the ROM 82, and outputs the image in the converted output resolution. The flow ends thereafter. In the above-described flow, if the size-associated conveying speed determined in the size-associated conveying speed determining process in S5 and the resolution-associated conveying speed determined in the resolution-associated conveying speed determining process in S6 are the same, the read image is in the resolution specified by the user in S2. Therefore, conversion of the output resolutions in S9 into the output resolution set in the output resolution setting process in S2 is omitted.

Although an example of carrying out the invention has been described, those skilled in the art will appreciate that there are numerous variations and permutations of the image reading apparatus that fall within the spirit and scope of the invention as set forth in the appended claims. It is to be understood that the subject matter defined in the appended claims is not necessarily limited, to the specific features or act described above. Rather, the specific features and, acts described above are disclosed as example forms of implementing the claims.

For example, the present invention may not necessarily be applied to the image reading apparatus 1 described above but may be applied to a multifunction peripheral device (MFP) having an image forming unit and a plurality of functions, such as a copying function and a printing function. The MFP may have the image reading apparatus in an upper section, and the image forming unit in a lower section. In this configuration, the control unit 80 may be stored in the image forming unit in the lower section rather than the image reading apparatus in the upper section.

For another example, the driving force generated in the sheet conveyer motor M and transmitted to the main roller 60 may not necessarily be reduced at the reducer system 65 according to a predetermined reduction ratio to be transmitted to the drive shaft 57 of the separator roller 55. For example, the reducer system 65 may be omitted, and a drive motor different from the sheet conveyer motor M to specifically drive the drive shaft 57 of the separator roller 55 may be provided. If such a different motor is provided, it is preferable that the different motor is controlled to change the sheet conveying speeds based on the predetermined reduction ratio according to the changes of the conveying speeds in the sheet conveyer motor M.

For another example, the applicable options for the size-associated conveying speed and the resolution-associated conveying speed, which are the first, second, and third conveying speeds, may not necessarily be common between the size-associated conveying speed and the resolution-associated conveying speed. In other words, the size-associated conveying speed may have its applicable options, and the resolution-associated conveying speed may have its different applicable options respectively as long as the higher conveying speeds are associated with the larger sizes for the original sheets S in the size-associated conveying speed correspondence table, and the lower conveying speeds are associated with the higher output resolutions in the resolution-associated correspondence table.

What is claimed is:

1. An image reading apparatus, comprising:
   a driving unit;
   a separator unit configured to separate a plurality of stacked sheets one-by-one and convey the separated sheets along a conveyer path;
   a conveyer unit configured to be driven by driving force transmitted from the driving unit to convey the sheets separated by the separator unit in a conveying direction further along the conveyer path;
   a reader unit configured to read images from the sheets being conveyed along the conveyer path;
   a reducer unit configured to reduce the driving force transmitted to the conveyer unit at a predetermined reduction ratio and transmits the reduced driving force to the separator unit;
   a size detecting unit configured to detect a size of the sheet being conveyed; and
   a controller configured to control operations in the image reading apparatus including a conveying speed to convey the sheet,
   wherein the controller manipulates the conveyer unit via the driving unit to convey the sheet at a first conveying speed when the size of the sheet detected by the size detecting unit is greater than a predetermined size; and
   wherein the controller manipulates the conveyer unit via the driving unit to convey the sheet at a second conveying speed, which is lower than the first conveying speed, when the size of the sheet detected by the size detecting unit is one of smaller than and equivalent to the predetermined size.

2. The image reading apparatus according to claim 1,
   wherein the size detecting unit detects a size of the sheet that falls within amongst a plurality of different sizes; and
   wherein the controller controls the conveying speed via the driving unit to convey the sheet at a predetermined lower conveying speed when the size of the sheet detected by the size detecting unit is a smaller size than the other size amongst the plurality of different sizes.

3. The image reading apparatus according to claim 2,
   wherein the controller comprises:
   a resolution setting unit, in which a resolution for the reader unit to read the image from the sheet is set;
   a conveying speed determining unit, in which a conveying speed is determined according to the resolution set in the resolution setting unit; and
   a comparing unit, in which a conveying speed determined according to the size detected by the size detecting unit and the conveying speed determined by the conveying speed determining unit are compared with each other; and
   wherein the controller manipulates the conveyer unit to convey the sheet at the conveying speed determined according to the size detected by the size detecting unit and the reader unit to read the image from the sheet whilst the sheet is conveyed at the conveying speed determined in accordance with the size detected by the size detecting unit.

4. The image reading apparatus according to claim 3, wherein the controller comprises:
a reader controlling unit configured to control the reader unit to read the image from the sheet in the resolution corresponding to the conveying speed determined in accordance with the size detected by the size detecting unit when the conveying speed determined in accordance with the size detected by the size detecting unit is determined by the comparing unit to be lower than the conveying speed determined by the conveying speed determining unit;
a resolution converter unit configured to convert the resolution of the image read by the reader unit under control of the reader controlling unit into the resolution set by the resolution setting unit; and
an output unit configured to output the image in the resolution converted by the resolution converter unit.

5. The image reading apparatus according to claim 1, further comprising:
an edge detecting unit configured to comprise a movable member, which is arranged in a downstream position with respect to the separator unit along the conveying direction and is configured to be moved by contact with an edge of the sheet being conveyed along the conveyer path; and a detector, which is configured to detect the edge of the sheet being conveyed based on the movement of the movable member.

6. The image reading apparatus according to claim 1, wherein the separator unit comprises:
a drive shaft configured to be driven and rotated by the reduced driving force transmitted via the reducer unit;
a contact member configured to idle with respect to the drive shaft within a predetermined idling range and arranged to be in contact with the stacked sheets; and
a clutch configured to one of connect the drive shaft with the contact member to transmit the reduced driving force transmitted to the drive shaft to the contact member and to disconnect the contact member from the drive shaft depending on a position of the contact member with respect to the drive shaft.

* * * * *